United States Patent [19]
Rieth

[11] 3,929,315
[45] Dec. 30, 1975

[54] SOLENOID VALVE ASSEMBLY
[75] Inventor: Lawrence E. Rieth, Springfield, Ill.
[73] Assignee: Stewart-Warner Corporation, Chicago, Ill.
[22] Filed: July 25, 1974
[21] Appl. No.: 491,817

[52] U.S. Cl................................. 251/129; 251/141
[51] Int. Cl.²......................................... F16K 31/06
[58] Field of Search ....... 251/141, 129; 137/596.16, 137/596.17, 625.64, 625.65

[56] References Cited
UNITED STATES PATENTS

| | | | |
|---|---|---|---|
| 3,558,099 | 1/1971 | Giorgi | 251/129 |
| 3,598,360 | 8/1971 | Merriner | 251/129 |
| 3,630,482 | 12/1971 | Beller | 251/129 X |
| 3,743,240 | 7/1973 | Merriner | 251/141 X |
| 3,805,203 | 4/1974 | Deckard | 251/129 X |

FOREIGN PATENTS OR APPLICATIONS

| | | | |
|---|---|---|---|
| 1,157,869 | 11/1963 | Germany | 251/141 |

Primary Examiner—Arnold Rosenthal

[57] ABSTRACT

A solenoid valve assembly where all of the parts are successively stacked during assembly including a connector housing having inlet and outlet ports therein, a valve plunger insertable into said connector housing, a biasing spring for biasing the valve plunger into the connector housing, there being provided a coil assembly having a nonmetallic valve spool with a sleeve that surrounds the valve plunger having an integral nonmetallic partition in the spool sleeve that defines a stop for the valve plunger during its opening movement and also defines the gap between the valve plunger and a slug member on the opposite side of the partition, with the partition also serving to eliminate the necessity of a seal for fluid flowing down the valve plunger into the spool, and a core plate on the slug to increase the electromagnetic field with a header member having a terminal stacked on the end of the coil assembly, thereby completing the assembly.

12 Claims, 5 Drawing Figures

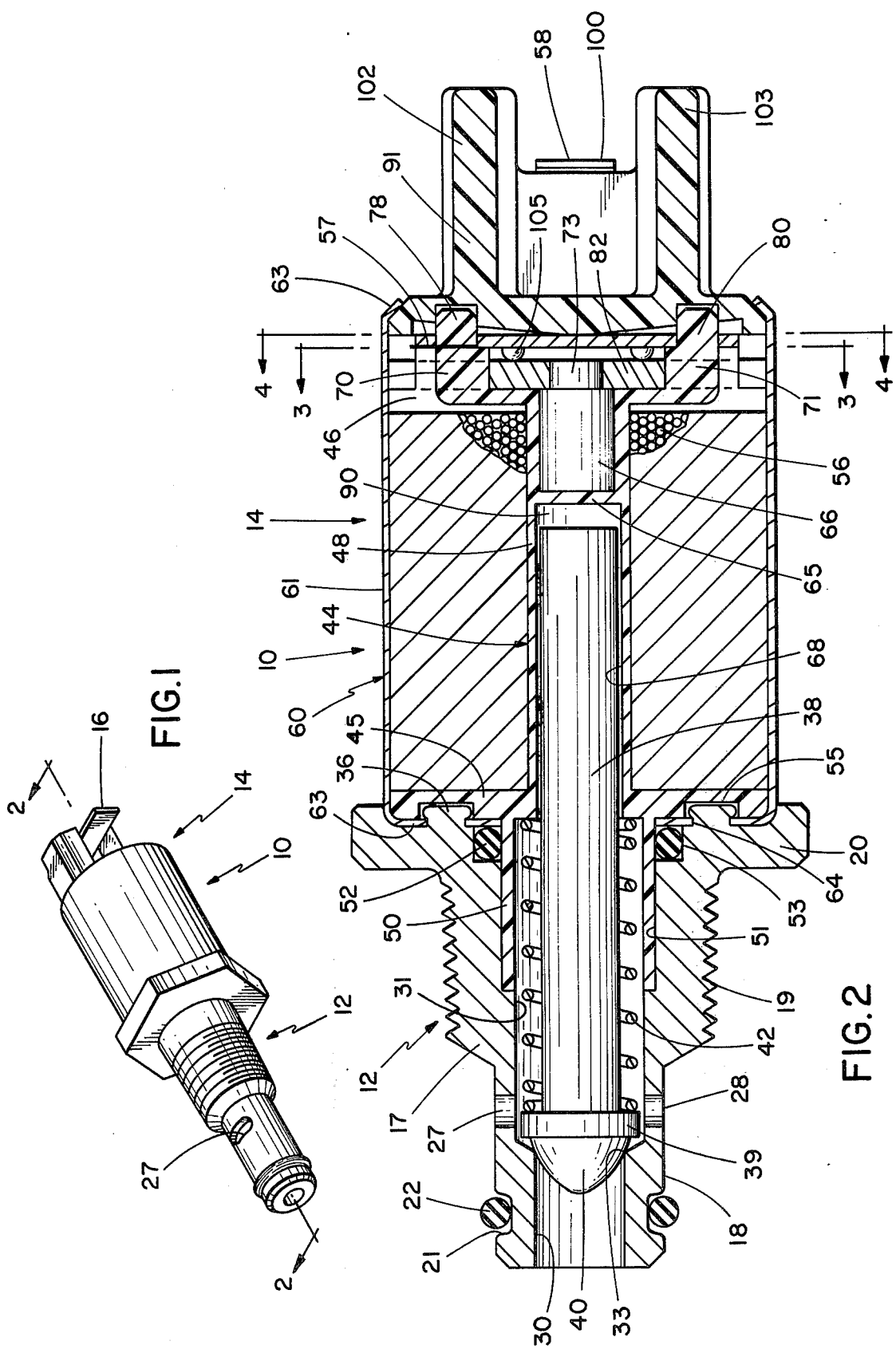

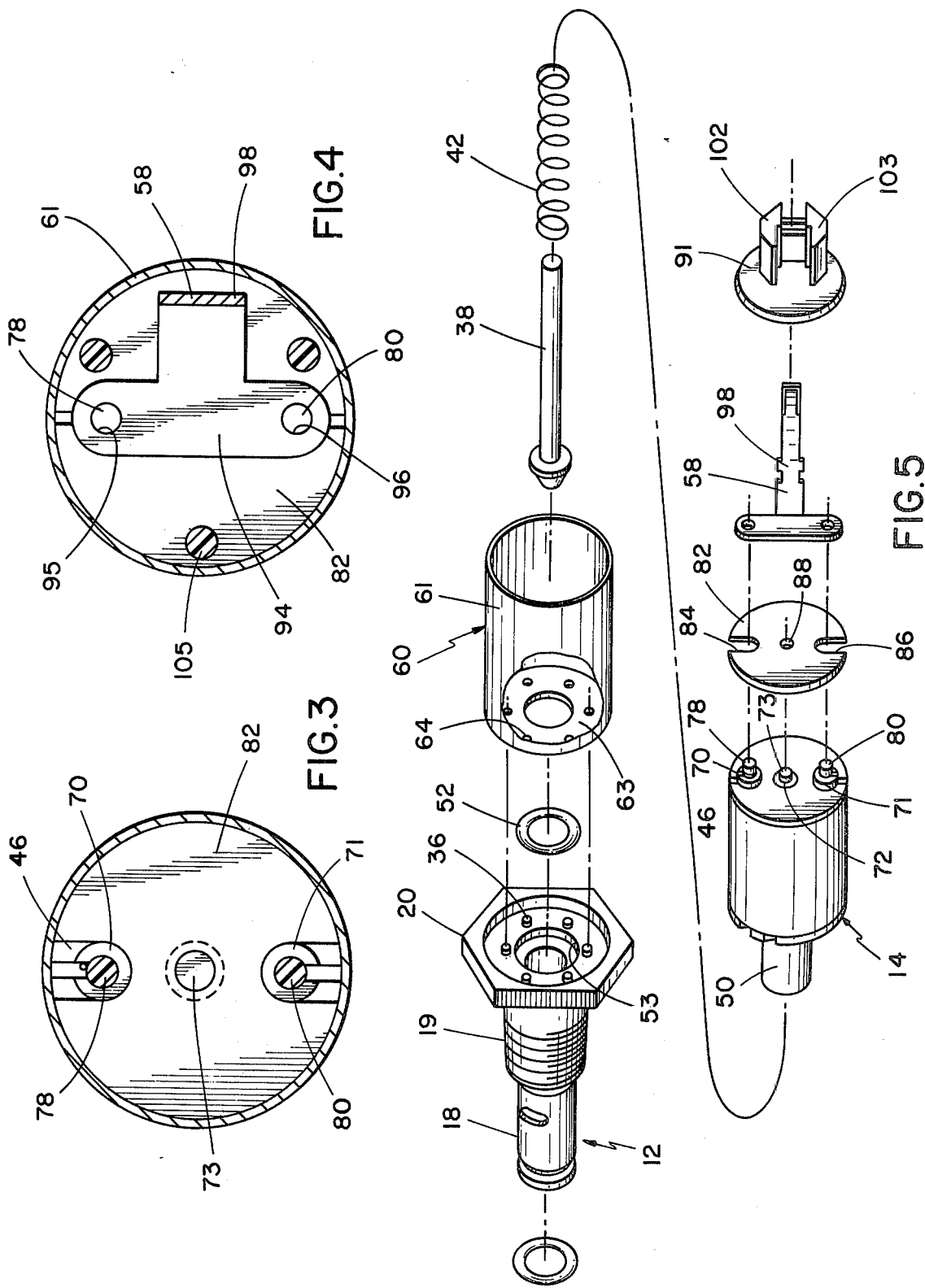

SOLENOID VALVE ASSEMBLY

BACKGROUND OF THE PRESENT INVENTION

There have in the past been provided a wide variety of solenoid valve assemblies, but for certain applications prior art constructions have been found too complicated with too many parts, frequently resulting in sealing problems, and these prior devices are also difficult to manufacture.

These prior art solenoid valves are well known to include some sort of valve configuration in which a valve plunger is operated by a coil member to open and close the valve against the force of a biasing spring.

It is, therefore, a primary object of the present invention to reduce the number of parts in a solenoid valve assembly, increase the ease of assembly, and also improve the sealing characteristics thereof.

SUMMARY OF THE PRESENT INVENTION

In accordance with the present invention, a solenoid valve assembly is provided of simplified construction requiring fewer moving parts, constructed in a manner so that all of the parts may be stacked, one upon the other, in very simple fashion during manufacture, and in which the sealing characteristics of the solenoid valve are increased considerably.

The present solenoid valve assembly is adapted to be employed to direct gasoline, or other fuel, from the carburetor bowl into the intake manifold of a vehicular engine during starting to assist in the more rapid starting of the vehicular engine. Toward this end, a connector housing is provided that has threads directly engageable with a portion of the engine carburetor. This housing has an inlet port communicating with the carburetor bowl and an outlet port communicating with the automobile intake manifold. A valve plunger is reciprocable in the housing that selectively opens and closes communication between the inlet and outlet ports. A spring is provided for biasing the valve plunger to its closed position within the connector housing. Stacked on the connector housing is a coil assembly, including a nonmetallic spool having interengaging means with the connector housing. Formed integrally with the connector spool, and more particularly the sleeve portion thereof, is a nonmetallic partition that performs multiple functions in this environment. Firstly, it acts as a stop, limiting opening movement of the valve plunger; secondly, it defines both the open and closed gap providing a calibrated gap with a higher drop out voltage, i.e., a lesser decrease in solenoid voltage is required to release the valve plunger to its closed position; and thirdly, the partition acts to eliminate the necessity for a separate seal element for preventing fluid flow along the valve stem itself. On the opposite side of the partition is a metallic slug that serves to increase the electromagnetic field along with a core plate that is stacked on the slug as with the other parts. The last element in the combination is a header that serves to retain a terminal member in position and also holds the entire coil assembly together when interfitted with a shell surrounding the coil assembly.

BRIEF DESCRIPTION OF THE DRAWINGS

FIG. 1 is a perspective view of the solenoid valve assembly according to the present invention;

FIG. 2 is an enlarged longitudinal section taken generally along line 2—2 of FIG. 1;

FIG. 3 is a cross section taken generally along line 3—3 of FIG. 2;

FIG. 4 is a cross section taken generally along line 4—4 of FIG. 2; and

FIG. 5 is an exploded view of the entire solenoid valve assembly according to the present invention.

DETAILED DESCRIPTION OF THE PREFERRED EMBODIMENT

Referring to the drawings, and particularly FIGS. 1 and 2, a solenoid valve assembly 10 is illustrated consisting basically of a valve assembly 12 and interconnected solenoid assembly 14 for actuating the valve assembly 12. The solenoid valve assembly 12 is actuated through a terminal 16 by a suitable source of power.

The solenoid valve assembly 10 is adapted to be a cranking fuel solenoid for supplying gasoline or other fuel to the intake manifold of a vehicular engine upon starting. That is, the terminal 16 is connnected in the engine starting circuit so that the valve 12 opens permitting a predetermined flow of fuel from the carburetor float bowl to the intake manifold to assist starting, when the starter motor is on. When the starter motor is turned off by the operator through the vehicular ignition switch, the valve 12 closes, terminating the supply of unaerated fuel from the carburetor bowl to the intake manifold, at which time the normal functions of the carburetor are effective to maintain the proper fuel-to-air mixture into the intake manifold of the vehicle engine.

As illustrated in the drawings, and more particularly FIG. 2, the valve assembly 12 includes a stepped cylindrical housing 17 including a reduced diameter portion 18, a threaded enlarged diameter portion 19 and a flange portion 20. The flange portion 20 is hexagonally shaped, as shown both in FIG. 1 and FIG. 5. For the purpose of threading the enlarged diameter portion 19 into a suitable receivable recess (not shown) in the carburetor itself. The reduced diameter portion has a recess 21 which receives an O-ring 22 for the purpose of forwardly sealing the solenoid valve assembly 10 within the carburetor housing itself.

The reduced diameter portion 18 of the valve housing 17 has elongated diametrically opposed apertures 27 and 28 which form the inlet ports to the valve 12. The inlet ports 27 and 28 are adapted, when the solenoid valve assembly is installed in the carburetor, to be in free communication with the float bowl of the carburetor.

A stepped bore is formed within the valve assembly housing 17 defined by a forward reduced cylindrical bore 30 communicating with an enlarged diameter bore 31 interconnected by a main valve seat 33. The inlet ports 27 and 28 freely communicate with enlarged bore portion 31, and the reduced diameter cylindrical bore 30 defines the outlet port for the valve assembly 12.

As seen in both FIGS. 2 and 5, six rearwardly extending projections 36 are formed on the inside of the hexagonal flange 20 for the purpose of attaching the solenoid or coil assembly 14 thereto.

Slidable within the enlarged bore 31 and extending partly into the coil assembly 14 is a valve plunger stem 38 of cylindrical configuration, having an enlarged head 39 with a projection (not shown) receiving a semi-spheroidical rubber valve head 40. The valve head 40 is adapted to contact the main valve seat 33 to effect opening and closing of the valve plunger 38.

For the purpose of biasing the valve plunger 38 to its closed position, a coil compression spring 42 is provided that reacts on its left end against the enlarged portion 39 and at its right end against the coil assembly 14.

The coil or solenoid assembly 14 is rigidly attached to the housing 17 by means of the projections 36. Coil assembly 14 includes a nylon spool assembly 44 consisting of cylindrical end members 45 and 46, separated by an integral sleeve 48.

The left end member 45 has an integral annular forward projection 50 that is received within a counterbore 51 in the enlarged bore 31 within valve housing 17.

For purposes of sealing the sleeve 50 to the housing 17, an O-ring 52 is provided in a second counterbore 53 adjacent the end of the sleeve counterbore 51.

The left end member 45 of the spool 44 has suitable recesses 55 for the purpose of receiving the projections 36 on the right side of the valve housing 17, as illustrated in FIG. 1. Extending between the sides 45 and 46 of the spool are coil windings 56. The input end of the coil winding is illustrated at 57 which, as will appear below, is connected to portion 58 of terminal 16, and the other end of the coil winding is wrapped around the sleeve 50 to ground the wire on housing 17.

Surrounding the coil assembly and forming a part thereof is a cup-shaped coil shell or housing 60, consisting of a cylindrical portion 61 and an annular portion 63 having six apertures 64 for receiving the projections 36 on the housing 17 to rigidly secure the coil assembly 14 to the valve housing 17. The right end of the cylindrical shell 61 is staked as shown at 63 for the purpose of maintaining the parts of the coil assembly 14 as a unitary assembly.

An important aspect of the present invention is the provision of an integral partition 65 extending entirely across the interior of the spool sleeve 48. This partition has multiple functions. Firstly, it serves as a stop for the valve plunger 38 and thus determines the opening aperture adjacent valve seat 33 and valve surface 40. Moreover, this partition 65 serves to determine the gap between the valve plunger 38 and steel slug 66 mounted in the rear end of the sleeve 48. The partition thus serves when the valve is in its open position, to provide a higher drop out voltage for the valve assembly 12, or expressed otherwise, it enables a lesser decrease in applied voltage to release the valve plunger 38.

A third function of the partition 65 is to seal bore 68 of sleeve 48 from fluid flowing within the valve bore 31, and in this manner the partition 65 serves to eliminate the necessity for additional separate sealing parts.

As seen more clearly in FIG. 5, the right end 46 of the spool 44 has cylindrical projections 70 and 71, with a central aperture 72 that receives a reduced stem 73 on the slug 66. As shown in FIGS. 2, 3 and 5, the cylindrical elements 70 and 71 have reduced portions 78 and 80, either of which may receive the wire end 57 which is wrapped around one of the posts 78, 80 for electrical connection with the terminal portion 58, as will appear hereinafter.

For the purpose of increasing the strength of the electromagnetic field, with the steel slug 56 is a cylindrical core plate 82, shown in FIGS. 2, 3, 4 and 5. As seen most clearly in FIG. 5, the plate 82 has U-shaped recesses 84 and 86, diametrically opposed for receiving the cylindrical bosses 70 and 71 on the spool end member 46. Central aperture 88 in plate 82 receives and engages the reduced stem 73 on slug 66.

The electromagnetic field or flux path is defined through the slug 66, core plate 82 which engages the shell 61, through the shell 61, down front surface 63 of the shell and through the valve stem 38, across gap 90, back to the steel slug 66.

Sealed adjacent the core plate 82 is a closing header assembly 91 which carries the terminal 16.

As seen clearly in FIGS. 4 and 5, the terminal 16 includes a T-shaped portion 94 having apertures 95 and 96 that receive the posts 78 and 80, so that the terminal 16 intimately engages the wire end 57 of the coil regardless of which post 78 or 80 the end wire is wrapped around. The terminal 16 has a longitudinally bent portion 98, as shown in FIG. 4, which extends through the header 91 and has a right angle portion 100, shown in FIG. 2, which is bent between projections 102 and 103 on the header 91.

The projections 102 and 103 are adapted to receive a suitable connector having a contact which engages terminal portion 100 for the purpose of providing the proper energization to the coil 56.

As seen in FIGS. 2 and 4, rounded projections 105 extend inwardly from the header 91 for the purpose of spacing the header 91 from the core plate 82.

Thus, the coil 56 is energized through terminal member 16 which engages the coil wire end 57 around post 78 or 80 as desired.

As seen clearly in FIG. 5, which is an exploded view of the present solenoid valve assembly, all of the elements of the assembly are assembled during manufacture in predetermined stacking configuration, facilitating manufacture considerably. More particularly, the O-ring 52 is first inserted in counterbore 53 and thereafter the shell 61 is placed on the projection 36 and staked securely. Then plunger 38 is inserted in bore 31. The coil spring 42 is then placed over the valve stem 38 and the spool assembly 44 inserted into the counterbore 51 along with shell 61, aligning the recesses 55 with the projections 36 on the right side of the valve housing 17. Plate 82 is then easily received on the plug projection 73 and spool bosses 70 and 71. Thereafter, the header assembly with the terminals is inserted into the shell 61 with the terminal apertures 95 and 96 over the reduced projections 78 and 80 on the end member 46 of the spool. The shell 61 is then staked as shown at 63, resulting in a completed unitary and rigid assembly.

What is claimed is:

1. A solenoid valve assembly, comprising; housing means, inlet port means in said housing means, outlet port means in said housing means, a valve seat between said inlet port means and said outlet port means, a valve member movable between a closed position blocking flow from said inlet port means and an open position permitting flow from said inlet port means to said outlet port means, said valve member including a plunger stem, a coil assembly surrounding at least a portion of said plunger stem, said coil assembly including a shell, said shell having a plurality of apertures receiving portions of said housing means for holding the coil assembly to the housing means, seal means between said housing and said coil assembly, said coil assembly including a sleeve surrounding said plunger stem, and an integral partition in said sleeve defining a stop for said plunger stem.

2. A solenoid valve assembly as defined in claim 1, wherein said partition extends across said sleeve and seals fluid in said sleeve adjacent said plunger thereby eliminating the necessity for a seal at the end of the sleeve opposite the valve seat.

3. A solenoid valve assembly as defined in claim 1, wherein said partition is constructed of nonmetallic material thereby defining the valve closed and valve open air gap.

4. A solenoid valve assembly as defined in claim 3, including a metallic member in said sleeve on the side of the partition opposite said valve seat to increase the strength of the electromagnetic field.

5. A solenoid valve assembly as defined in claim 4, including a shell housing surrounding said coil assembly, a metallic plate on the end of said coil assembly opposite said valve seat, said plate being in engagement with said metallic member and with said housing.

6. A solenoid valve assembly that may be stacked during assembly, comprising; a connector housing having a valve seat therein, an inlet port in said connector housing communicating with said valve seat, an outlet port in said connector housing communicating with the other side of said valve seat, a valve plunger freely insertable in said connector housing into engagement with said valve seat from one side of said connector housing, spring means insertable from said one side around said valve plunger into said connector housing, a coil assembly insertable partly in said connector housing from said one side having interengaging means with said connector housing, said coil assembly including a nonmetallic spool having a central sleeve, said valve plunger projecting into said central sleeve, said coil assembly having a shell housing in engagement with said connector housing, and a terminal header in said shell housing on the side of the coil assembly opposite the connector housing for maintaining the parts together, said shell surrounding said spool and having an open upper end, said open end of said shell being bent around the terminal header for holding the header in place.

7. A solenoid valve assembly that may be stacked during assembly, comprising; a connector housing having a valve seat therein, an inlet port in said connector housing communicating with said valve seat, an outlet port in said connector housing communicating with the other side of said valve seat, a valve plunger freely insertable in said connector housing into engagement with said valve seat from one side of said connector housing, spring means insertable from said one side around said valve plunger into said connector housing, a coil assembly including a nonmetallic spool having a central sleeve, said valve plunger projecting into said central sleeve, said coil assembly having a shell housing in engagement with said connector housing, said shell having an open upper end, and a terminal header in said shell housing for maintaining the parts together, said open end of said shell being bent around said terminal header, said sleeve including an integral partition for limiting movement of said valve plunger away from said valve seat.

8. A solenoid valve assembly as defined in claim 7, wherein said sleeve has a metallic slug therein on the side of the partition opposite said valve seat for increasing the strength of the magnetic field, said partition defining the gap between the slug and the valve plunger.

9. A solenoid valve assembly as defined in claim 8, including a core plate on the side of the coil assembly opposite said valve seat and in engagement with said slug and with said housing shell.

10. A solenoid valve assembly, comprising; housing means, inlet port means in said housing means, outlet port means in said housing means, a valve seat between said inlet port means and said outlet port means, a valve plunger movable between a closed position blocking flow from said inlet port means and an open position permitting flow from said inlet port means to said outlet port means, said valve plunger including a plunger stem, a coil assembly surrounding at least a portion of said plunger stem, seal means between said housing and said coil assembly, said coil assembly including a sleeve surrounding said plunger stem, and an integral partition in said sleeve defining a stop for said plunger stem, said partition extending across said sleeve and sealing fluid in said sleeve adjacent said plunger thereby eliminating the necessity for a seal at the end of the sleeve opposite the valve seat, said partition being constructed of nonmetallic material thereby defining the valve closed and valve open gaps, said coil assembly including a shell housing having an open upper end, said open end being bent inwardly to maintain the coil 11. A solenoid valve assembly, comprising; housing means, inlet port means in said housing means, outlet port means in said housing means, a valve seat between said inlet port means and said outlet port means, a valve member movable between a closed position blocking flow from said inlet port means to said outlet port means, said valve member including a plunger stem, a coil assembly surrounding at least a portion of said plunger stem, seal means between said housing and said coil assembly, said coil assembly including a sleeve surrounding said plunger stem, an integral partition in said sleeve defining a stop for said plunger stem, said partition extending across said sleeve and sealing fluid in said sleeve adjacent said plunger thereby eliminating the necessity for a seal at the end of the sleeve opposite the valve seat, said partition being constructed on nonmetallic material thereby defining the valve closed and valve open gaps, a metallic member in said sleeve on the side of the partition opposite said valve seat to increase the strength of the electromagnetic field, a shell housing surrounding said coil assembly, said shell having an open upper end bent inwardly, and a metallic plate on the end of said coil assembly opposite said valve seat, said plate being in engagement with said metallic member and with said housing.

12. A solenoid valve assembly which may be stacked during assembly, comprising; a connector housing having a valve seat thereon, an inlet port in said connector housing communicating with said valve seat, an outlet port in said connector housing communicating with the other side of said valve seat, a valve plunger freely insertable in said connector housing into engagement with said valve seat from one side of said connector housing, spring means insertable from said one side around said valve plunger into said connector housing, a coil assembly insertable on said connector housing from said one side having interengaging means with said connector housing, said coil assembly including a nonmetallic spool having a central sleeve, said valve plunger projecting into said central sleeve, said coil assembly having a shell housing and having a plurality of apertures receiving portions of said connector housing in engagement with said connector housing, a terminal header in said shell housing on the side of the coil assembly opposite the connector housing for maintaining the parts together, said shell housing having an open end bent around said terminal header to maintain the parts in position, said sleeve including an integral partition for limiting movement of said valve plunger away from said valve seat, said sleeve having a metallic slug therein on the side of the partition opposite said valve seat for increasing the strength of the magnetic field, said partition defining the gap between the slug and the valve plunger, and a core plate on the side of the coil assembly opposite said valve seat for increasing the strength of the magnetic field, said partition defining the gap between the slug and the valve plunger, and a core plate on the side of the coil assembly opposite said valve seat and in engagement with said slug and with said housing shell.

* * * * *